US012153591B1

(12) United States Patent
Bordawekar

(10) Patent No.: US 12,153,591 B1
(45) Date of Patent: Nov. 26, 2024

(54) CAPTURING RELATIVE IMPORTANCE OF RELATIONAL ENTITIES FOR EMBEDDING

(71) Applicant: International Business Machines Corporation, Armonk, NY (US)

(72) Inventor: Rajesh Bordawekar, Westchester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/334,424

(22) Filed: Jun. 14, 2023

(51) Int. Cl.
G06F 16/2457 (2019.01)
G06F 16/2455 (2019.01)
G06F 16/28 (2019.01)
G06F 40/30 (2020.01)

(52) U.S. Cl.
CPC .. *G06F 16/24578* (2019.01); *G06F 16/24564* (2019.01); *G06F 16/288* (2019.01); *G06F 40/30* (2020.01)

(58) Field of Classification Search
None
See application file for complete search history.

(56) References Cited

U.S. PATENT DOCUMENTS

| 8,364,612 B2 | 1/2013 | Van Gael et al. |
| 10,394,803 B2 | 8/2019 | Bordawekar et al. |
| 10,721,142 B1 * | 7/2020 | Mathur ............... H04L 41/5022 |
| 10,984,030 B2 | 4/2021 | Bordawekar et al. |
| 11,074,253 B2 | 7/2021 | Bordawekar et al. |
| 11,080,273 B2 | 8/2021 | Bandyopadhyay et al. |
| 11,100,100 B2 | 8/2021 | Bandyopadhyay et al. |
| 11,182,414 B2 | 11/2021 | Bandyopadhyay et al. |
| 2016/0179945 A1 | 6/2016 | Lastra-Diaz et al. |

(Continued)

FOREIGN PATENT DOCUMENTS

CA 3004008 A1 11/2018

OTHER PUBLICATIONS

Bordawekar, et al., "Cognitive Database: A Step towards Endowing Relational Databases with Artificial Intelligence Capabilities," arXiv:1712.07199v1 [cs.DB] Dec. 19, 2017.

(Continued)

*Primary Examiner* — Kannan Shanmugasundaram
(74) *Attorney, Agent, or Firm* — Amin, Turocy & Watson, LLP

(57) ABSTRACT

Systems, computer-implemented methods, and computer program products to facilitate capturing relative importance of relational entities for building database embedding models are provided. According to an embodiment, a system can comprise a processor that executes computer-executable components stored in a computer-readable storage medium. The computer executable components can comprise a user input component that can receive user-specified schema information for weight-based model training. The computer executable components can comprise a relational component that can identify one or more importance levels for one or more entities of a relational table based on the user-specified schema information. The computer executable components can comprise a training component that generates a training document having entity occurrences corresponding with the one or more importance levels.

20 Claims, 7 Drawing Sheets

(56) References Cited

U.S. PATENT DOCUMENTS

2018/0322295 A1 11/2018 Bordawekar et al.
2022/0245175 A1* 8/2022 Hawco .................. G06F 16/906

OTHER PUBLICATIONS

Cai, et al., "A Novel Framework for Ranking Model Adaptation," 2010 Seventh Web Information Systems and Applications Conference, IEEE Computer Society, 2010, Aug. 20-22, 2010, Huhehot, China, pp. 149-154.

Author Unknown, "Method to Identify and Rank Essential Structural and Interdependent Elements for Robust Database Tool and Application Validation," IP.com, IPCOM000201618D, IP.com Electronic Publication Date: Nov. 16, 2010, 6 pages.

* cited by examiner

CAPTURING RELATIVE IMPORTANCE OF RELATIONAL ENTITIES FOR EMBEDDING

BACKGROUND

Artificial Intelligence (AI) powered databases can use word vector representations of relational entities to enable various types of Structures Query Language (SQL) semantic queries, such as cognitive intelligence queries. Further, word vectors can be generated from an unstructured representation of the structured relational data for further processing in connection with new types of SQL semantic queries. The subject disclosure relates to allowing users to associate an importance to different entities of a relational table that can be used to build vectors, and more specifically, to determine the weighting of relationship linkages between entities based on column attributes or value to enable weight-based model training.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate user-specified directed weights for typed entities are provided.

In various embodiments, a system can comprise a processor that executes computer-executable components stored in a computer-readable storage medium, wherein the computer-executable components can comprise a user input component, a relational component, and a training component. With embodiments, the user input component can receive user-specified schema information for weight-based model training. Further, the relational component can identify an importance level for one or more entities of a relational table based on the user-specified schema information. Additionally, the training component can generate a training document having entity occurrences corresponding with the importance level.

DETAILED DESCRIPTION

Figure 1:
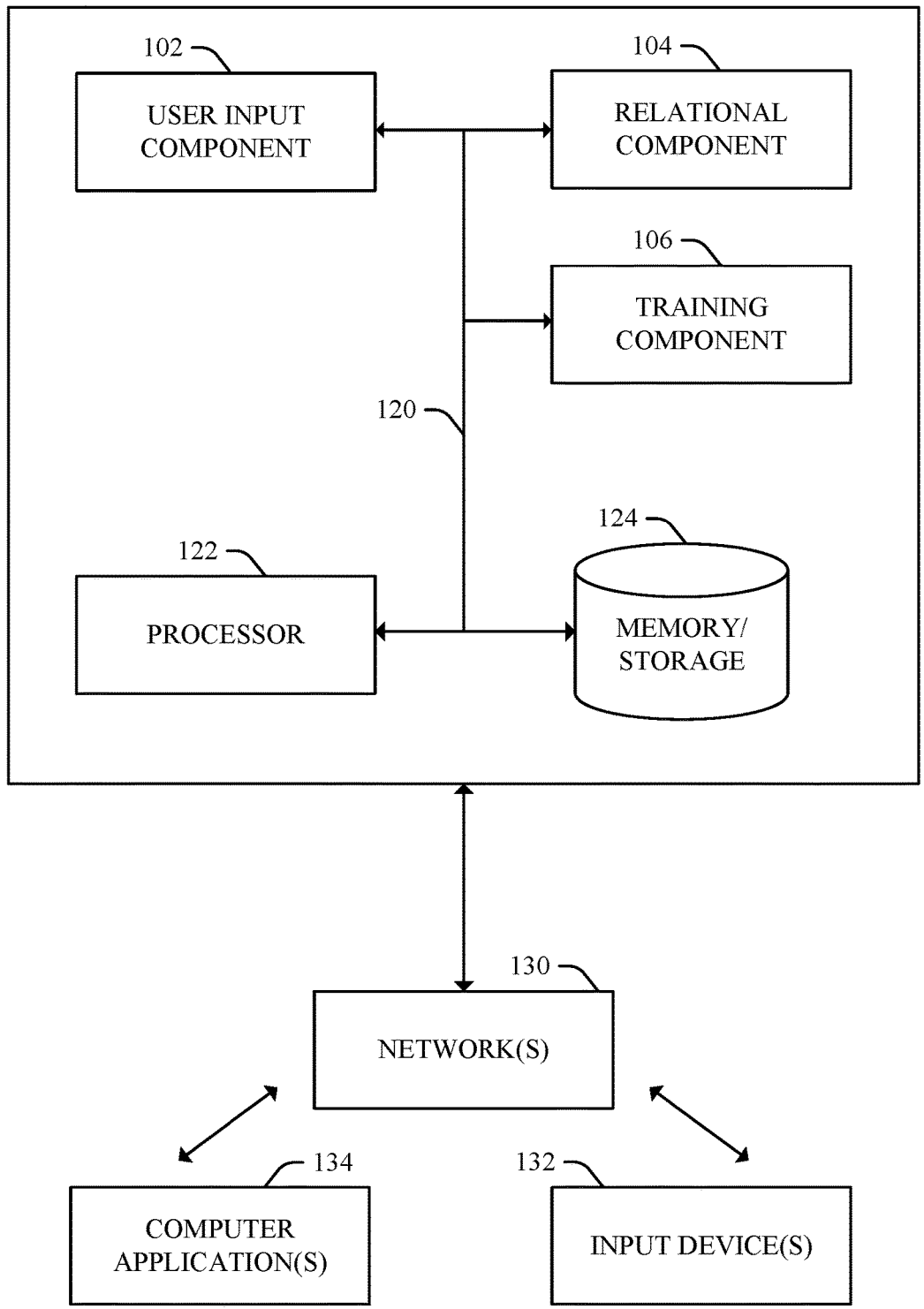
FIG. 1 illustrates a block diagram of an example, non-limiting system that can facilitate using importance tags to direct training of vectors of an AI-powered database in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

AI-powered databases can be designed to handle structured and unstructured data, including images, videos, and natural language text. AI-powered databases can additionally use deep learning techniques such as convolutional neural networks (CNNs) and recurrent neural networks (RNNs) to recognize patterns in data and make predictions.

An advantage of AI-powered databases is that they can learn from past queries, data usage patterns, and user behavior to optimize their performance over time. AI-powered databases can also identify correlations and hidden patterns in data that traditional databases may not recognize, leading to more accurate insights and predictions. Furthermore, AI-powered databases can be used for a variety of applications, including natural language processing, recommendation systems, and predictive analytics.

SQL (Structured Query Language) can be a popular programming language used for managing relational databases. One of the primary features of SQL can be its ability to perform queries on the data stored in a database. A SQL query can be a statement used to retrieve data from a database based on specified search criteria. SQL queries can be simple or complex, and they can be used to retrieve data from one or multiple tables.

In SQL, searching for a specific value can be a common query operation. This operation can be achieved by using the WHERE clause in the SQL query. The WHERE clause can be used to filter rows based on a specific condition. For example, if one desires to search for all the customers who have a specific email address, the WHERE clause can be used to specify the condition that the email address must match the value to be searched for.

SQL queries can also use operators to search for values. For example and without limitation, these operators can include the equals sign (=), greater than (>), less than (<), and not equals (!=). For example, if it is desired to determine all customers who have spent more than $100 in a specific month, the WHERE clause can be used with the greater than operator to specify the condition.

In addition to searching for a specific value, SQL queries can also be used to search for ranges of values. This can be achieved by using the BETWEEN operator, which can allow the specification of a range of values for a specific column. For example, if it is desired to search for all customers who have spent between $100 and $200 in a specific month, the WHERE clause can be used with the BETWEEN operator to specify the condition.

Overall, SQL queries can provide a powerful tool for searching for specific values in a database; however, the interpretability can be limited when searching databases based on user-specified weights. Given problems described above with existing SQL queries, the present disclosure can be implemented to produce a solution to these problems in the form of systems, computer-implemented methods, and/or computer program products that can facilitate specifying importance of relationships between entities of a relational table and using importance tags to direct training of the corresponding vector representations for weight-based model training.

Further, AI-powered databases can be adapted to receive user input and can be searched by semantic meaning, thus increasing the searching and analysis capabilities of the AI-powered database. For example and without limitation, a neural network technique can be used (e.g., database embedding) that can capture the latent hidden meaning from a relational table, and can use embedding representations to enable new classes of semantic SQL queries.

In some embodiments, the present disclosure can be implemented to produce a solution to the problems described above in the form of systems, computer-implemented methods, and/or computer program products that can further facilitate user-specified directed weights for typed entities by: receiving user-specified schema information; specifying one or more importance levels for one or more column attributes of a relational table; and identifying one or more importance levels for the one or more column attributes of the relational table based on the user-specified schema information.

According to an aspect of the invention, there is provided a system that comprises a processor that executed computer-executable components stored in a computer-readable storage medium, wherein the computer-executable components comprise a user input component, a relational component, and a training component. The user input component can receive user-specified schema information for weight-based model training. Additionally, the relational component can identify one or more importance levels for one or more entities of a relational table based on the user-specified schema information. In various aspects, the training component can generate a training document having entity occurrences corresponding with the one or more importance levels. An advantage of the system can be to enable user input to direct model training via weights as designated by a user. Such user input to the system can enable weight-based SQL semantic queries or model training. A further advantage of the system can be to identify an importance level and a direction of relationship in relation to one or more entities of a relational table to influence model training.

In various aspects, the one or more entities can be weighed by column-based priority or value-based priority. Accordingly, the user can designate columns or values that can influence training. In embodiments, weighing entities by value-based priority can have the technical advantage of designating separate values of the table to be used in training. Additionally or alternatively, weighing entities by column-based priority can have the technical advantage of designating a class of entities to be used in training. An advantage of enabling column-based priority or value-based priority can be to increase the variety or manner in which the user can train a model, for example, by selectively weighing columns or values in generating the training document.

In other various aspects, the one or more entities can be assigned one or more importance tags corresponding with the one or more importance levels to direct training of one or more vectors of the training document. Accordingly, the one or more importance tags can enable the user to influence training directly. An advantage of the system can be to use one or more importance tags, which can be specified by the user, to label one or more tokens of a vector to provide training direction. Such can facilitate increased control of the model training process.

In various aspects, the relational component can generate one or more probability values to compare the one or more entities with a low level of importance threshold. Accordingly, the user can define the low level of importance threshold to compare with the one or more probability values in generating the training document. An advantage of the system can be to include a user-defined low importance tag to influence training of a model.

In other various aspects, the one or more entities can be represented by one or more tokens and the relational component can remove occurrences of the one or more tokens according to the probability value. Accordingly, the system can determine and/or evaluate the contents of the relational table with respect to the user-defined importance tags. An advantage of the system can be to designate a low level of importance (e.g., a frequency of inclusion for the one or more entities) to be used in designating the manner to train the model (e.g., per the user input). In various aspects, the relational component can replicate occurrences of one or more tokens representing the one or more entities according to the one or more importance tags associated with a low level of importance, a medium level of importance, and a high level of importance. Accordingly, the system can alter the occurrences of the one or more tokens via the tags as designated by the user (e.g., in the user-specified schema information) to influence the training of a model or generating a training document to be used for training or other SQL operations. An advantage of the system can be to generate and alter the occurrences (e.g., which can correspond with weights) for tokens representing values of a relational table in training a model.

In other various aspects, the relational component can compare the one or more entities with an entity in the relational table, or an additional entity in an additional relational table; and the training component can train a relational data model via the training document. Accordingly, the system can facilitate comparing the one or more entities with a variety of other entities or identifiers, which can be used to influence generation of the relational data model. An advantage of the system can be to train a data model via the training document, which, during training, has been influenced by the user via the user-specified schema information.

According to an aspect of the invention, there is provided a computer-implemented method that comprises receiving, by a device operatively coupled to a processor, user-specified schema information for weight-based model training.

Additionally, computer-implemented method can comprise identifying, by the device, one or more importance levels for one or more entities of a relational table based on the user-specified schema information. In various aspects, the computer-implemented method can comprise generating, by the device, a training document having entity occurrences corresponding with the one or more importance levels. An advantage of the computer-implemented method can be to enable user input to direct model training via weights as designated by a user. Such user input can enable weight-based SQL semantic queries or model training. A further advantage of the computer-implemented method can be to identify one or more importance levels to influence model training.

In various aspects, the one or more entities can be weighed by column-based priority or value-based priority. Accordingly, the user can designate columns or values that which can influence training. In embodiments, weighing entities by value-based priority can have the technical advantage of designating separate values of the table to be used in training. Additionally or alternatively, weighing entities by column-based priority can have the technical advantage of designating a class of entities to be used in training. An advantage of enabling column-based priority or value-based priority can be to increase the variety or manner in which the user can train a model, for example, by selectively weighing columns or values in generating the training document.

In other various aspects, the computer-implemented method can include assigning, by the device, the one or more importance tags corresponding with the one or more importance levels to direct training of one or more vectors of the training document. Accordingly, the one or more importance tags can enable the user to influence training directly. An advantage of the computer-implemented method can be to use importance tags, which can be specified by the user, to label tokens of the vector to provide training direction. Such can facilitate increased control of the model training process.

In various aspects, the computer-implemented method can comprise generating, by the device, one or more probability values to compare the one or more entities with a low level of importance threshold. Accordingly, the user can define the low level of importance threshold to compare with the one or more probability values in generating the training document. An advantage of the computer-implemented method can be to designate a low level of importance threshold to be used in designating the manner to train the model (e.g., per the user input).

In various aspects, the computer-implemented method can comprise representing, by the device, the one or more entities by one or more tokens. Additionally, the computer-implemented method can comprise removing, by the device, occurrences of the one or more tokens according to the probability value. Accordingly, the computer-implemented method can alter the occurrences of the one or more tokens via the low importance tags as designated by the user (e.g., in the user-specified schema information) to influence the training of a model or generating a training document to be used for training or other SQL operations. An advantage of the computer-implemented method can be generating and altering the occurrences (e.g., which can correspond with weights) for tokens representing values of a relational table in training a model.

In various aspects, the computer-implemented method can comprise, by the device, replicating occurrences of one or more tokens representing the one or more entities according to the one or more importance tags associated with a low level of importance, a medium level of importance, and a high level of importance. An advantage of the computer-implemented method can be generating additional occurrences for tokens representing values of a relational table to influence training a model.

In other various aspects, the computer-implemented method can comprise comparing, by the device, the one or more entities with an entity in the relational table, or an additional entity in an additional relational table, and training, by the device, a relational data model via the training document. An advantage of the computer-implemented method can be training a data model via the training document, which, during training, has been influenced by the user via the user-specified schema information.

According to yet another aspect of the invention, there is provided a computer program product comprising a computer readable storage medium having program instructions embodied therewith, executable by a processor to cause the processor to receive user-specified schema information for weight-based model training. Additionally, the computer program product can cause the processor to receive user-specified schema information for weight-based model training. The computer program product can identify one or more importance levels for one or more entities of a relational table based on the user-specified schema information. In various aspects, the computer program product can cause the processor to generate a training documents having entity occurrences corresponding with the one or more importance levels. An advantage of the computer program product can be to enable user input to direct model training via weights as designated by a user. Such user input can enable weight-based SQL semantic queries or model training. A further advantage of the computer program product can be to identify an importance level for one or more entities of a relational table to influence model training.

In various aspects, the program instructions can cause the processor to weigh the one or more entities by column-based priority or value-based priority. Accordingly, the user can designate columns or values which can influence training. In embodiments, weighing entities by value-based priority can have the technical advantage of designating separate values of the table to be used in training. Additionally or alternatively, weighing entities by column-based priority can have the technical advantage of designating a class of entities to be used in training. An advantage of enabling column-based priority or value-based priority can be to increase the variety or manner in which the user can train a model, for example, by selectively weighing columns or values in generating the training document.

In other various aspects, the computer program product can cause the processor to assign one or more importance tags corresponding with the one or more importance levels to direct training of one or more vectors of the training document. Accordingly, the one or more importance tags can enable the user to influence training directly. An advantage of the computer program product can be to use importance tags, which can be specified by the user, to label one more tokens of a vector to provide training direction for a model. Such can facilitate increased control of the model training process.

In various aspects, the computer program product can cause the processor to generate, by the device, one or more probability values to compare the one or more entities with a low level of importance threshold. Accordingly, the user can define the low level of importance threshold to compare with the one or more probability values in generating the training document. An advantage of the computer program product can be to include a variety of user-defined importance tags to influence training of a model. Additionally, an advantage can be that the processor can determine if a probability of occurrence for the one or more probability values is within the low level of importance threshold and can assign one or more low importance tags to one or more corresponding tokens. Accordingly, the computer program product can determine and/or evaluate the contents of the relational table with respect to the user-defined importance tags. An advantage of the computer program product can be to designate a low importance level to be used in designating the manner to train the model (e.g., per the user input).

In various aspects, the computer program product can cause the processor to represent the one or more entities by one or more tokens; and remove occurrences of the one or more tokens according to the one or more probability values. An advantage of the computer program product can be removing occurrences of one or more tokens in accordance with the one or more probability values generated, per thresholds determined by the user-specified schema information.

In other various aspects, the computer program product can cause the processor to replicate occurrences of one or more tokens representing the one or more entities according to the one or more importance tags associated with a low level of importance, a medium level of importance, and a high level of importance. Accordingly, the computer program product can cause the processor to alter the occurrences of tokens via the one or more importance tags as designated by the user (e.g., in the user-specified schema information) to influence the training of a model or generating a training document to be used for training or other SQL operations. An advantage of the computer program product can be generating and altering the occurrences (e.g., which can correspond with weights) for one or more tokens representing values of a relational table in training a model.

Therefore, various embodiments described herein can be considered as outperforming various existing techniques for facilitating user-specified schema information for weight-based model training. For at least these reasons, various embodiments described herein certainly constitute useful and practical applications of computers.

As referenced herein, an "entity" can comprise a client, a user, a computing device, a software application, an agent, a machine learning (ML) model, an artificial intelligence (AI) model, and/or another entity.

FIG. 1 illustrates a block diagram of an example, non-limiting importance tag AI-database training system 100 that comprises a user input component 102, a relational component 104, and a training component 106. The user input component 102 can receive user-specified schema information for weight-based model training. The relational component 104 can identify one or more importance levels for one or more entities of a relational table based on the user-specified schema information. The training component 106 can generate a training document having entity occurrences corresponding with the one or more importance levels. Further, the system 100 can define the one or more entities as corresponding with either column attributes of the relational table or values of the relational table. Repetitive description of like elements employed in other embodiments described herein is omitted for sake of brevity. Aspects of systems (e.g., the importance tag AI-database training system 100 and the like), apparatuses or processes in various embodiments of the present invention can constitute one or more machine-executable components and/or computer executable components embodied, e.g., as a respective software module and/or software code, within one or more machines (e.g., embodied in one or more computer readable mediums (or media) associated with one or more machines/and/or computers). Such components, when executed by the one or more machines (e.g., computers, computing devices, virtual machines, a combination thereof, and/or the like) can cause the machines to perform the operations described.

Figure 7:
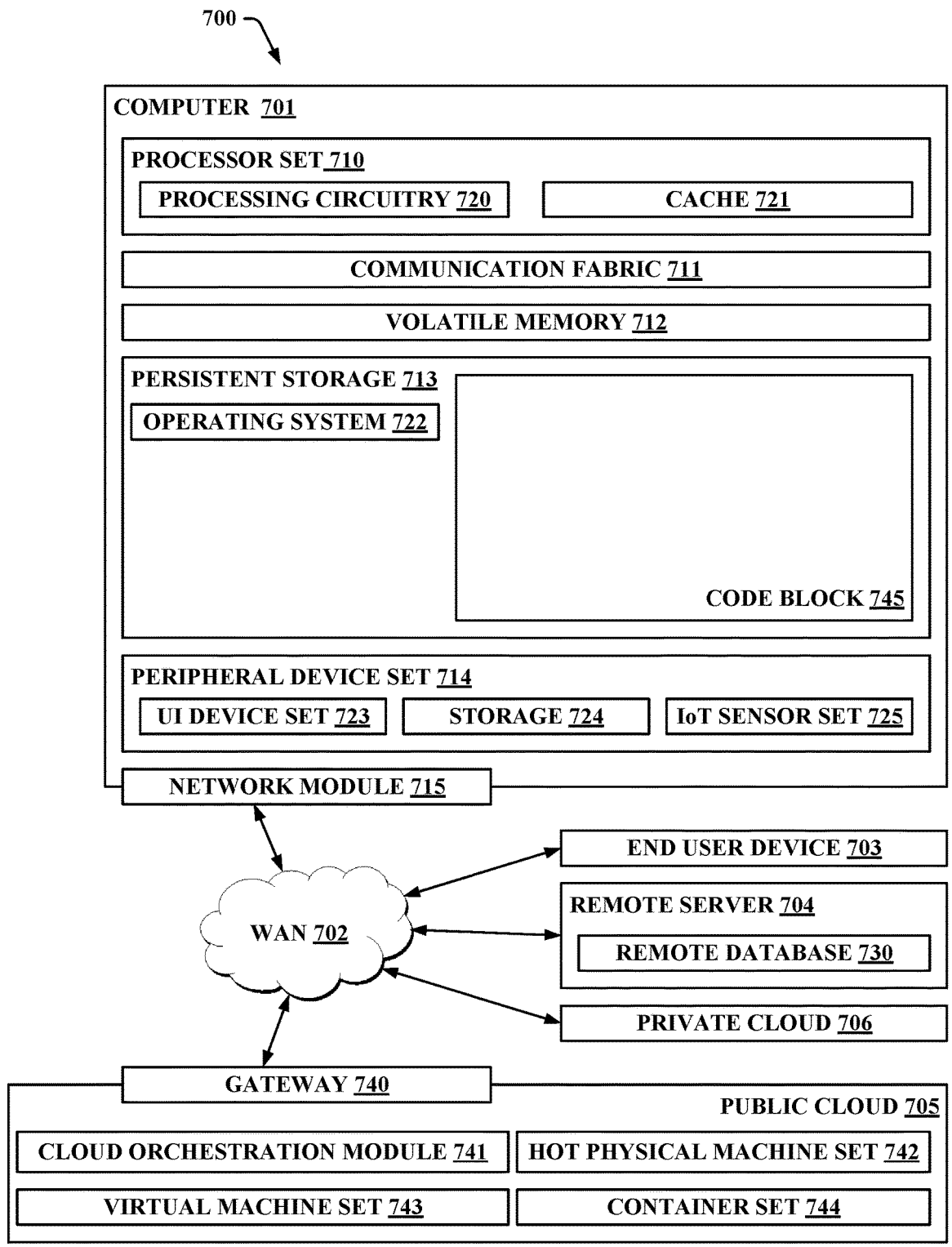
FIG. 7 illustrates a block diagram of an example, non-limiting operating environment in which one or more embodiments described herein can be facilitated.

Additional description of functionalities will be further described below with reference to the example embodiments of FIG. 1, where repetitive description of like elements and/or processes employed in respective embodiments is omitted for sake of brevity. The importance tag AI-database training system 100 can facilitate: i) receiving user-specified schema information for weight-based model training; ii) identifying one or more importance levels for one or more entities of a relational table based on the user-specified schema information; and iii) generating a training document having entity occurrences corresponding with the one or more importance levels. Further, the user input component 102, the relational component 104, and the training component 106 can be associated with a computing environment 700 (FIG. 7).

Discussion first turns briefly to system bus 120, processor 122, and memory 124 of importance tag AI-database training system 100. For example, in one or more embodiments, the importance tag AI-database training system 100 can comprise processor 122 (e.g., computer processing unit, microprocessor, classical processor, and/or like processor). In one or more embodiments, a component associated with importance tag AI-database training system 100, as described herein with or without reference to the one or more figures of the one or more embodiments, can comprise one or more computer and/or machine readable, writable and/or executable components and/or instructions that can be executed by processor 122 to enable performance of one or more processes defined by such component(s) and/or instruction(s).

In one or more embodiments, importance tag AI-database training system 100 can comprise a computer-readable memory (e.g., memory 124) that can be operably connected to the processor 122. Memory 124 can store computer-executable instructions that, upon execution by processor 122, can cause processor 122 and/or one or more other components of the importance tag AI-database training system 100 (e.g., the user input component 102, the relational component 104, and the training component 106) to perform one or more actions. In one or more embodiments, memory 124 can store computer-executable components (e.g., the user input component 102, the relational component 104, and the training component 106).

With embodiments, importance tag AI-database training system 100 and/or a component thereof as described herein, can be communicatively, electrically, operatively, optically and/or otherwise coupled to one another via bus 120. Bus 120 can comprise one or more of a memory bus, memory controller, peripheral bus, external bus, local bus, and/or another type of bus that can employ one or more bus architectures. One or more of these examples of bus 120 can be employed. In one or more embodiments, the importance tag AI-database training system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of the importance tag AI-database training system 100 can reside in the cloud, and/or can reside locally in a local computing environment (e.g., at a specified location(s)). In examples, the importance tag AI-database training system 100 can be connected with the bus 120, one or more input devices 132, and one or more computer applications 134, which can be associated with cloud computing environment 700 (FIG. 7).

In addition to the processor 122 and/or memory 124 described above, the importance tag AI-database training system 100 can comprise one or more computer and/or machine readable, writable and/or executable components and/or instructions that, when executed by processor 122, can enable performance of one or more operations defined by such component(s) and/or instruction(s). The importance tag AI-database training system 100 can be associated with, such as accessible via, a computing environment 700 described below with reference to FIG. 7. For example, importance tag AI-database training system 100 can be associated with a computing environment 700 such that aspects of processing can be distributed between the importance tag AI-database training system 100 and the computing environment 700.

Figure 2:
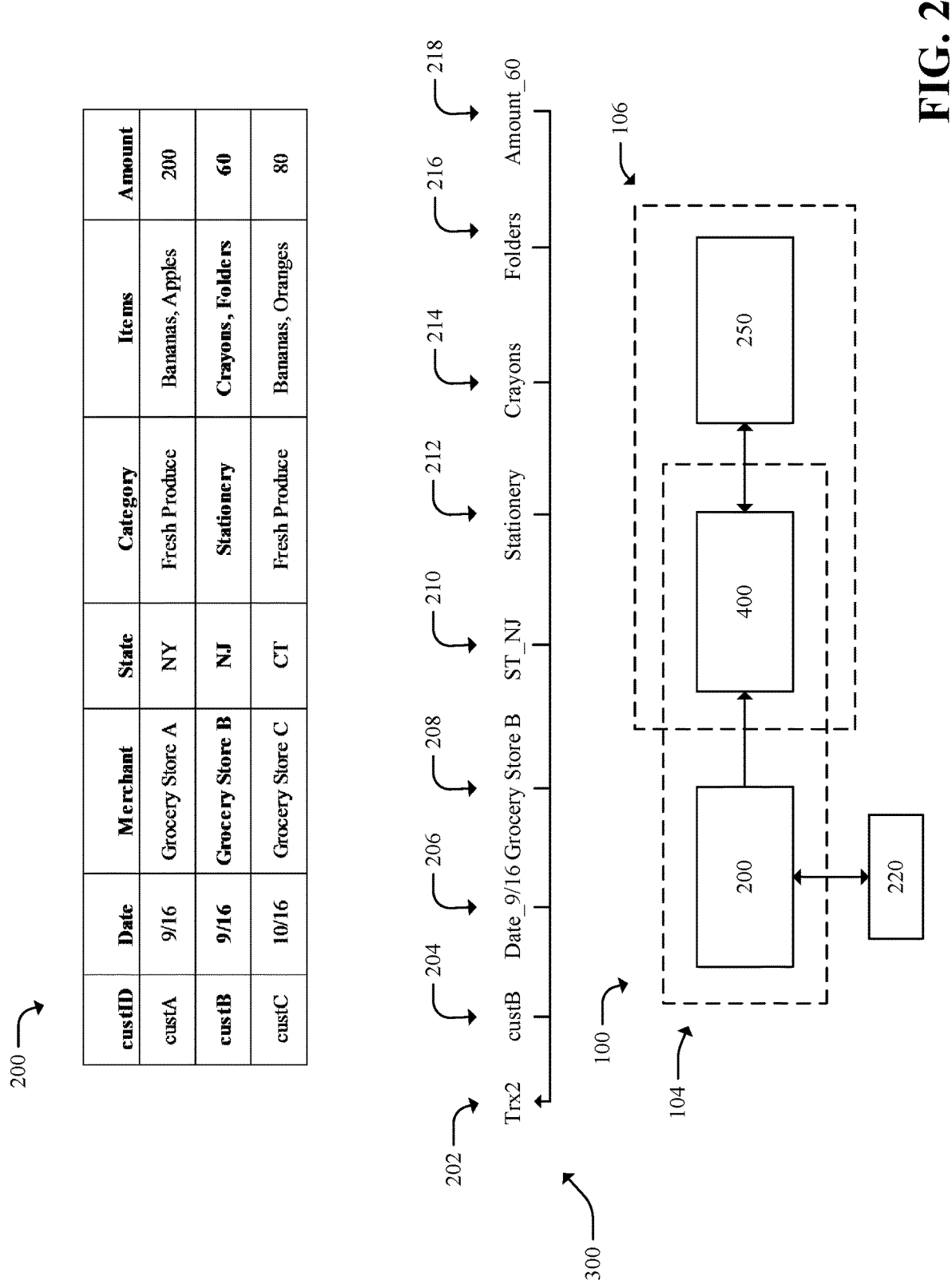
FIG. 2 illustrates a relational table, a corresponding vector, and a block diagram of an example, non-limiting system that can facilitate using importance tags to direct training of vectors of an AI-powered database in accordance with one or more embodiments described herein.

In embodiments, FIG. 2 generally illustrates a block diagram of an example, non-limiting importance tag AI-database training system 100 that can facilitate using importance tags to direct training of a relational data model 250 (e.g., via a training document) in accordance with one or more embodiments described herein. The non-limiting importance tag AI-database training system 100 can further facilitate database embedding (e.g., via a database embedding model 220) to capture latent hidden meaning from a relational table 200 and can use the representations to enable one or more of a variety of semantic SQL queries.

Figure 3:
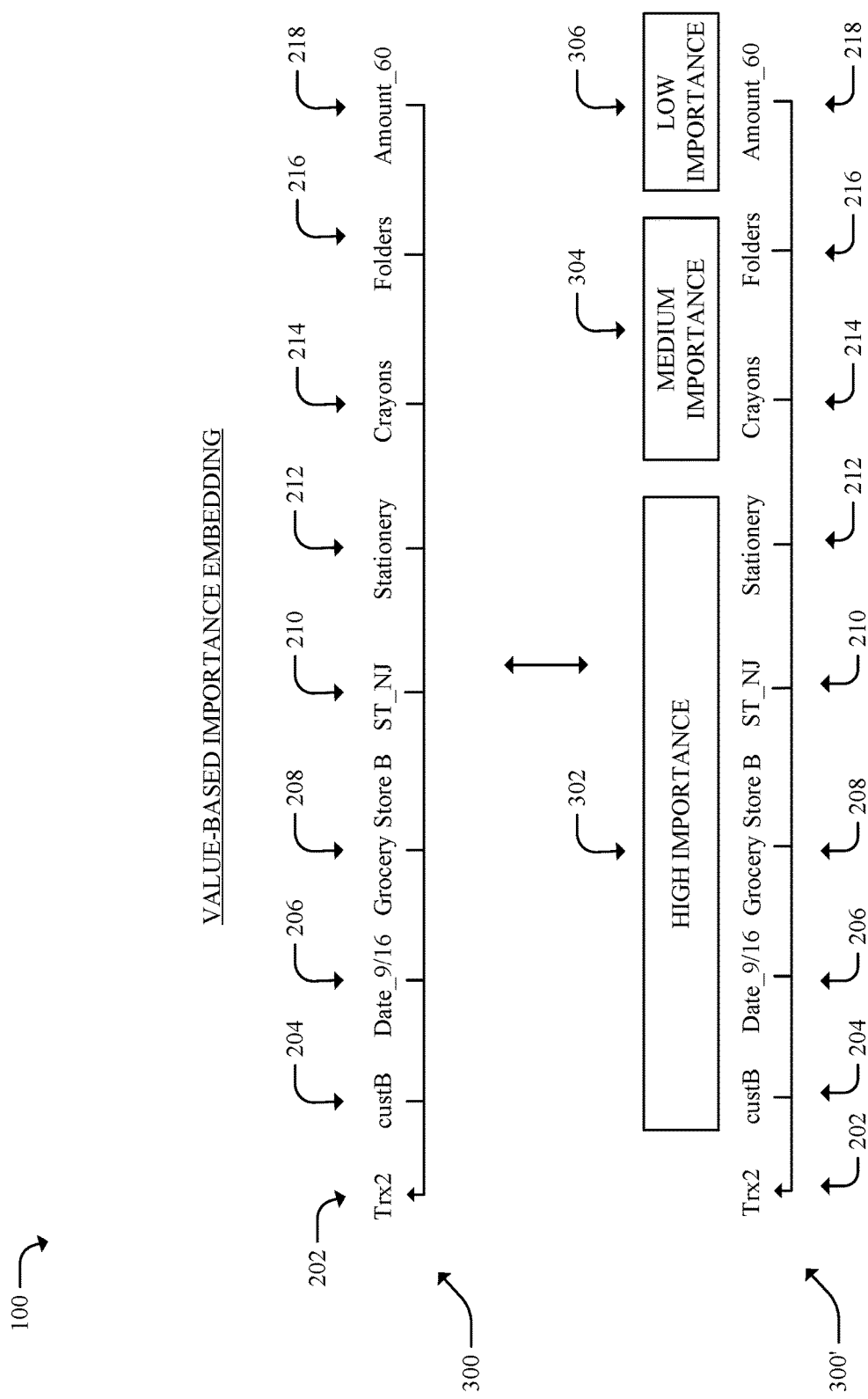
FIG. 3 illustrates an equal weighted vector and a corresponding weighted vector with importance tags illustrating a value-based non-limiting example of aspects of using importance tags to direct training of vectors of an AI-powered database in accordance with one or more embodiments described herein.

With examples, as can be generally illustrated by FIGS. 2 and 3, a relational table 200 and a corresponding vector 300 (e.g., a numeric floating-point values vector) can be used to compare relational entities (e.g., attributes or features of the relational table 200) by their semantic meaning. The semantic meaning for a relational value can be inferred by a corresponding database embedding model 220. The non-limiting importance tag AI-database training system 100 can further be configured to be coupled with or connected to a relational table 200. The relational table 200 can be of any size and can include one or more of a variety of information. The relational table 200 can be coupled with the database embedding model 220 to infer the relational values to generate semantic meaning. For example and without limitation, such as can be seen from FIGS. 2 and 3, the relational table 200 can include information corresponding to customer purchases made at a variety of grocery stores. With examples, the relational table can include any variety of information for weight-based model training, such as other purchases or transactions, or other data.

In embodiments, the relational table 200 can include information relating to a customer name, a transaction date, a merchant, a state, a category of purchase, a listing of items, and an amount spend for the transaction. The relational component 104 can generate a vector 300 to represent a row of the relational table 200. For example and without limitation, the relational component 104 can generate the vector 300 (e.g., unstructured data) corresponding to the second row of the relational table 200 of FIG. 2. The relational component 104 can be responsible for converting the information contained in the relational table 200 to a training document 400 including any number of vectors 300 corresponding to the rows of the relational table 200.

With examples, the relational component 104 can generate the vectors 300 corresponding with some or all rows of the relational table 200 during the training process. Further, the relational component 104 can represent one or more entities (e.g., the attributes or features of data contained within the cell of the relational table 200) of the relational table 200 as one or more tokens. As can be seen from FIG. 2, the vector 300 can include any number of tokens corresponding to one or more entities (e.g., columns and/or values) of the relational table 200. The vector 300 can include a row identifier 202 to represent a row of the relational table 200 which can be compared with another row identifier, another entity within the relational table 200 or another entity in another relational table. Further, one or more rows of additional relational tables can be converted into one or more vectors to be included in a training document in combination with the relational table 200 (e.g., with the vectors 300 of the relational table). In this manner, the row identifier 202 can be compared with another row identifier or another entity in the relational table 200 or in one or more of the additional relational tables. Further, the vector 300, can include a customer ID token 204 as "custB"; a date token 206 as "Date_9/16"; a merchant token 208; a state token 210 as "ST_NJ"; a category token 212 as "Stationery"; a first item token 214 as "Crayons"; a second item token 216 as "Folders"; and an amount token 218 as "Amount_60". The vector 300 can include the primary key row identifier "Trx2" to reference a row (e.g., the second row as in FIG. 2) of the relational table 200.

In embodiments, the row identifier 202 can be a token (e.g., a unique primary key), such as artificial primary key "Trx2" as seen in FIG. 2. The primary key can be unique per row of the relational table 200, and the primary key can include an inferred semantic meaning that can represent the meaning of the associated row of the relational table 200. In further examples, an artificial identifier can be used as the row identifier 202 if there is no primary key. Additionally, the relational component 104 and/or the training component 106 can generate the vectors 300 for one or more (or all) rows of the relational table 200. The non-limiting importance tag AI-database training system 100 can be responsible for converting the relational table 200 into a text-based document 400 (including the row to vector representations) for training a relational data model 250 (e.g., an AI-powered database or AI-database). The vector 300 in FIG. 2 can represent an equal weighting (e.g., before integrating and applying weights as included in the user-specified schema information) of the tokens for the corresponding row of the relational table 200 (in contrast to resulting vector 300' of FIG. 3 indicating weighted tokens). Further description is provided for assigning weights to one or more tokens during training in the following paragraphs.

Figure 4:
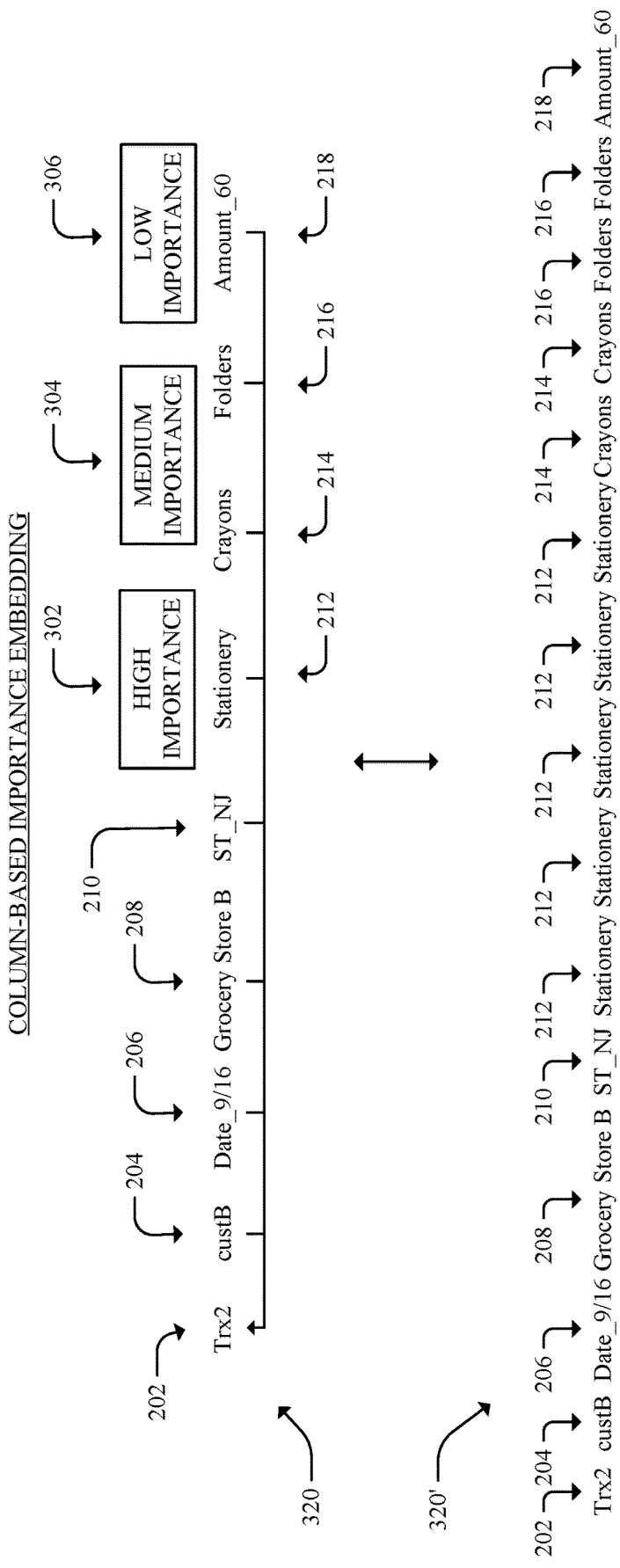
FIG. 4 illustrates an evaluated vector and a corresponding weighted vector illustrating column-based importance embedding as a non-limiting example of using importance tags to direct training of vectors of an AI-powered database in accordance with one or more embodiments described herein.

With embodiments, such as generally illustrated in FIG. 3, the non-limiting importance tag AI-database training system 100 can facilitate using importance tags 302-306 to direct training of a relational data model 250 (e.g. an AI-powered database) via vectors 300 of the training document 400 in accordance with one or more embodiments described herein. The non-limiting importance tag AI-database training system 100 can assign weights to the various tokens of the vector 300 per user-specified schema information received by the user-input component 102. The user-specified schema information can include information indicating columns and/or values of the vector 300 to prioritize during relational model (AI-database) training. Further, the user-specified schema information can indicate information of the relational table 200 to weigh differently than other information of the relational table 200 (e.g., the user can specify entities to label as high importance, medium importance, low importance, and default importance which can be received by a graphical user interface (GUI) connected with the user input component 104 and/or input devices 132) via importance tags 302-306. The one or more importance tags 302-306 can capture how each entity of the relational table 200 contributes while building meanings of neighboring entities. In examples, the non-limiting importance tag AI-database training system 100 can weigh information of the relational table 200 in one or more of a variety of manners. For example, the non-limiting importance tag AI-database training system 100 can sort/prioritize/weigh the data based on column (e.g., for column-based priority) or value (for value-based priority). In embodiments, FIG. 3 illustrates assigning weights and training via value-based importance, and FIG. 4 illustrates assigning weights and training via column-based importance. With value-based importance, the non-limiting importance tag AI-database training system 100 can weigh separate entities of a row of the relational table 200 with varying levels of importance (via importance tags). Additionally and alternatively, with column-based importance, the non-limiting importance tag AI-database training system 100 can weigh columns of the relational table 200 with varying levels of importance (via importance tags).

In embodiments, the relational component 104 and/or the training component 106 can weigh the one or more tokens of the vector 300 to reflect user-desired training (e.g., as included in the user-specified schema information). As shown in FIG. 3, the one or more tokens 202-218 of the vector 300 can be classified as a one or more of a variety of importance levels (e.g., via one or more importance tags). For example and without limitation, the tokens 202-218 can be classified as high importance, medium importance, low importance, and default importance (e.g., where no weighting is applied).

With examples, the relational component 104 and/or the training component 106 can assign importance levels/tags to the tokens 202-218 of the vector 300 based on user-specified schema information received by the user-input component 102. The relational component 104 and/or the training component 106 can assign the importance levels on a per-value basis. For example and without limitation, the relational component 104 and/or the training component 106 can specify certain values as more important and less important than others so that the user has input when training the model. As can be seen from FIG. 3, the category token 212 ("Stationery") can be considered by the user to be of high importance; and therefore, can include a high importance tag 302 within a resulting vector 300'. Further, in a similar manner, the first item token 214 and the second item token 216 can be considered by the user to be of medium importance; and therefore, can include a medium importance tag 304 within the resulting vector 300'. The amount token 218 can be considered by the user to be of low importance; and therefore, can include a low importance tag 306 within the resulting vector 300'. The importance tags can influence the number of occurrences for the one or more entities of the vectors 300' as reflected in the training document 400.

In examples, the relational component 104 can generate one or more probability values to compare the one or more entities with a low level of importance threshold. With examples, one or more of a variety of random number generators can be used to generate random values (e.g., probability values) for asserting priority in connection with the correlating importance tag 302-306 (as designated in the user specified schema information). The random number generator can generate random values between the range of 0 and 1.

Further, in response to the random number generator generating values less than 0.66 (e.g., a low importance threshold), the corresponding low importance entity/feature can be included in the resulting vector 300'. In one or more embodiments, the low importance threshold can be selected to include any range of values. Over iterations of training, the low importance threshold can signify that when one or more probability values are generated between 0 and 0.66, the corresponding entity/feature can be included in the training document. For probability values generated greater than 0.66, the relational component 104 and/or the training component 106 can skip (e.g., remove) the occurrence of the respective entity/feature. In this manner, the relational component 104 and/or the training component 106 can classify one or more entities as low importance and can skip training of the one or more entities (e.g., one or more tokens) classified as low priority.

Moreover, in embodiments, one or more probability values can be generated to be compared with each of the one or more entities (e.g., the one or more tokens) to see if the one or more entities can be included in the generated training document 400. In response to one or more probability values being outside the low importance threshold, the training component 106 can remove the occurrence of the one or more corresponding entities from the resulting vector 300' (e.g., such that the model can be trained without such values from the one or more entities). Further, the low threshold can be selected to include any range of suitable values for operation by the user, which can be indicative of the frequency of occurrence for the one or more low importance entities.

The relational component 104 and/or the training component 106 can determine if the one or more probability values (e.g., the random numbers generated via the random number generator) for one or more entities is within the low importance threshold. For low importance entities, where the probability value includes a value outside the low importance threshold, the relational component 104 and/or the training component 106 can remove the value (e.g., creating a null value) from the relational table 200 so that it is not reflected in the resulting vector 300' and not included when training the relational data model 250 with the training document 400.

Additionally and alternatively, the relational component 104 and/or the training component 106 can assign importance tags to direct training of the training document by classifying one or more entities as low importance, medium importance, and high importance (e.g., for either of value-based or column-based weighting/training). The relational component 104 and the training component can include one or more entities of low importance a first number of occurrences within the training document 400. For medium importance entities, the relational component 104 and/or the training component 106 can include the medium importance entity a second number of occurrences within the training document 400. For high importance entities, the relational component 104 and/or the training component 106 can include the high importance entity a third number of occurrences within the training document 400. For example and without limitation, the first number of occurrences can be less than the second number of occurrences and the third number of occurrences. The second number of occurrences can be greater than the first number of occurrences and can be less than the third number of occurrences. The first, the second, and the third number of occurrences for the varying importance levels can be designated by the user and included within the user-specified schema information.

In embodiments, such as generally illustrated in FIG. 4, the non-limiting importance tag AI-database training system 100 can facilitate column-based importance training. The relational component 104 and/or the training component 106 can assign one or more of a variety of actions with the varying levels of importance. For example and without limitation, the relational component 104 and/or the training component 106 can replicate tokens of the vector 320 corresponding with the various levels of importance to influence generating the training document 400 and training the relational data model 250. The non-limiting importance tag AI-database training system 100 (e.g., the relational component 104 and/or the training component 106) can replicate/duplicate tokens about five times (e.g., $k_1$ times, where $k_1$ can be any value desired by the user corresponding to high importance) to be represented as high importance for entities including the high importance tag 302. The corresponding training document 400 can include replicated/duplicated occurrences of the high importance tokens. With embodiments, the category token 212 of "Stationery" can be regarded as high importance (e.g., by the user-specified schema information), and as can be seen in the vector 320 the category token 212 appears a single time; and a corresponding weighted vector 320', the category token 212 appears five times. The category token 212 can be duplicated/replicated any number of times (e.g., ten times) to reflect a high importance weight as determined by the user-specified schema information. For example, during training, the column-based category tokens 212 can be duplicated any number of times greater than the occurrence for tokens of medium importance, low importance, or default classification (where the tokens are not duplicated or removed).

With embodiments, the non-limiting importance tag AI-database training system 100 (e.g., the relational component 104 and/or the training component 106) can replicate/duplicate tokens about two times (e.g., $k_2$ times, where $k_2$ can be any value desired by the user corresponding to medium importance) to be represented as medium importance for entities including the medium importance tag 304. The corresponding training document 400 can include replicated/duplicated occurrences of the medium importance tokens. With embodiments, the first item token 214 of "Crayons" can be regarded as medium importance (e.g., by the user-specified schema information), and as can be seen in the vector 320, the first item token 214 appears a single time; and in the weighted vector 320', the first item token 214 appears two times. The first item token 214 can be duplicated/replicated any number of times (e.g., two times) to reflect a medium importance weight as determined by the user-specified schema information. For example, during training, the column-based first item tokens 214 can be duplicated any number of times less than the number of occurrences for tokens of high importance and greater than the number of occurrences for tokens of low importance or default classification (where the tokens are not duplicated or removed).

In examples, the second item token 216 of "Folders" can be regarded as medium importance (e.g., by the user-specified schema information) and includes a medium importance tag 304, and as can be seen in the vector 320, the second item token 216 appears a single time. In the weighted vector 320', the second item token 216 can appear two times. The second item token 216 can be duplicated/replicated any number of times (e.g., two times) to reflect a medium importance weight as determined by the user-specified schema information. For example, during training, the column-based second item tokens 216 can be duplicated any number of times less than the number of occurrences for tokens of high importance and greater than the number of occurrences for tokens of low importance or default classification (where the tokens are not duplicated or removed).

With examples, the non-limiting importance tag AI-database training system 100 (e.g., the relational component 104 and/or the training component 106) can include tokens a single time (e.g., $k_3$ times, where $k_3$ can be any value desired by the user corresponding to low importance) to be represented as low importance for entities including the low importance tag 306. The corresponding training document 400 can include a single occurrence of low importance tokens. With embodiments, such as indicated by vector 320 of FIG. 4, the amount token 218 can be present within the relational table 200. In response to training by the training component 106, the training document 400 and corresponding weighted vector 320' can include the amount token 218 a single time.

In examples, the user-specified schema information can influence training of the relational data model 250 (e.g., an AI-powered database) by using importance tags 302-306 to direct training of one or more vectors in generating the training document 400. In this manner, the user can specify weights for columns or values of the relational table 200 to generate the training document 400 that can influence training of the relational data model 250. Further, a user can associate the one or more importance levels (e.g., default importance, low importance, medium importance, and high importance) to different column attributes used to build the vectors 300' and 320'.

With examples, the higher the importance level, the higher the number of occurrences of one or more tokens (e.g., one or more entities) within the training document 400; and further, the one or more tokens with higher occurrences will have a greater impact on the resulting relational data model 250 over iterations of training.

Figure 5:
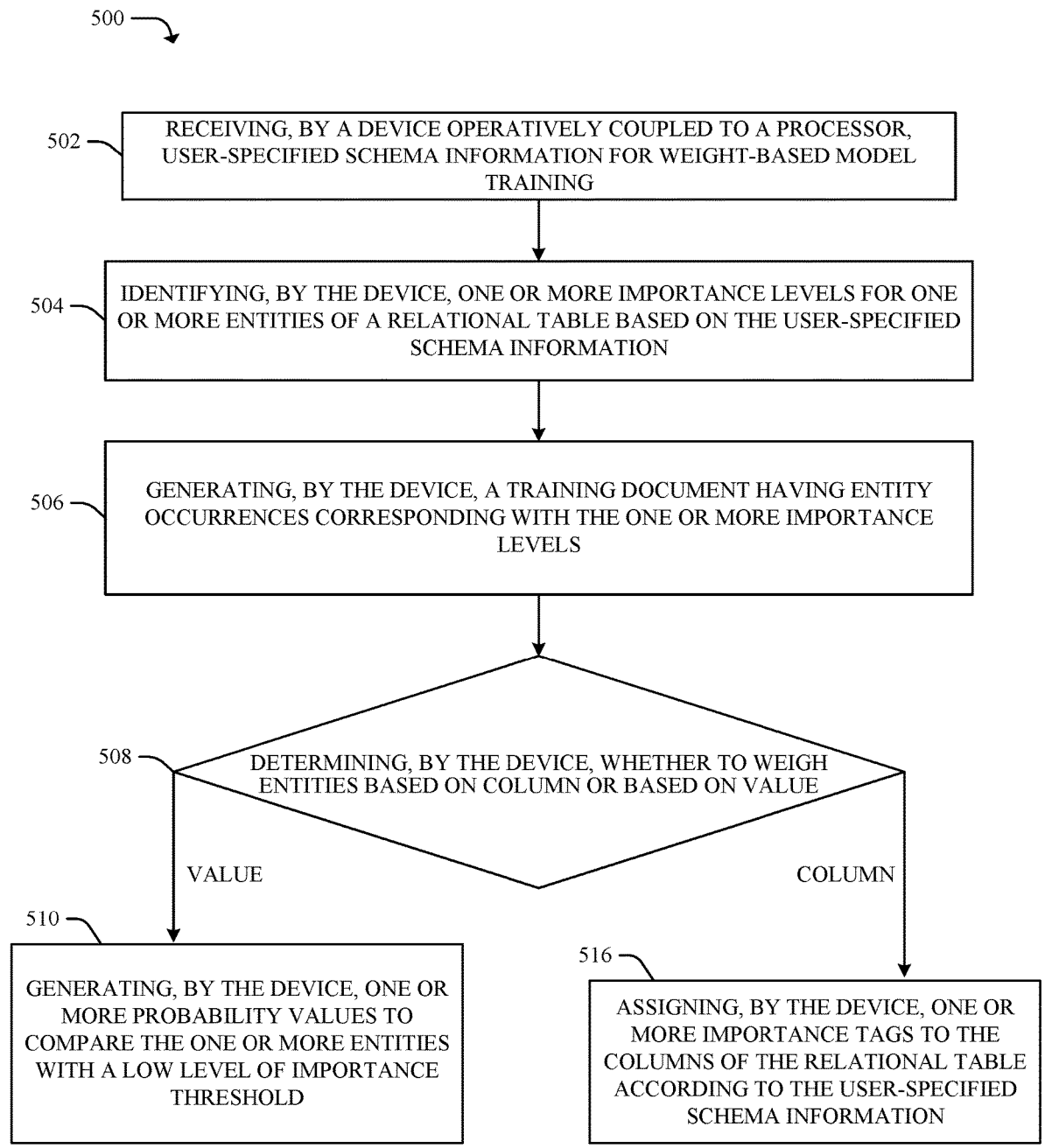
FIG. 5 illustrates a flow diagram of an example, non-limiting computer-implemented method that can facilitate using importance tags to direct training of vectors of an AI-powered database in accordance with one or more embodiments described herein.
Figure 6:
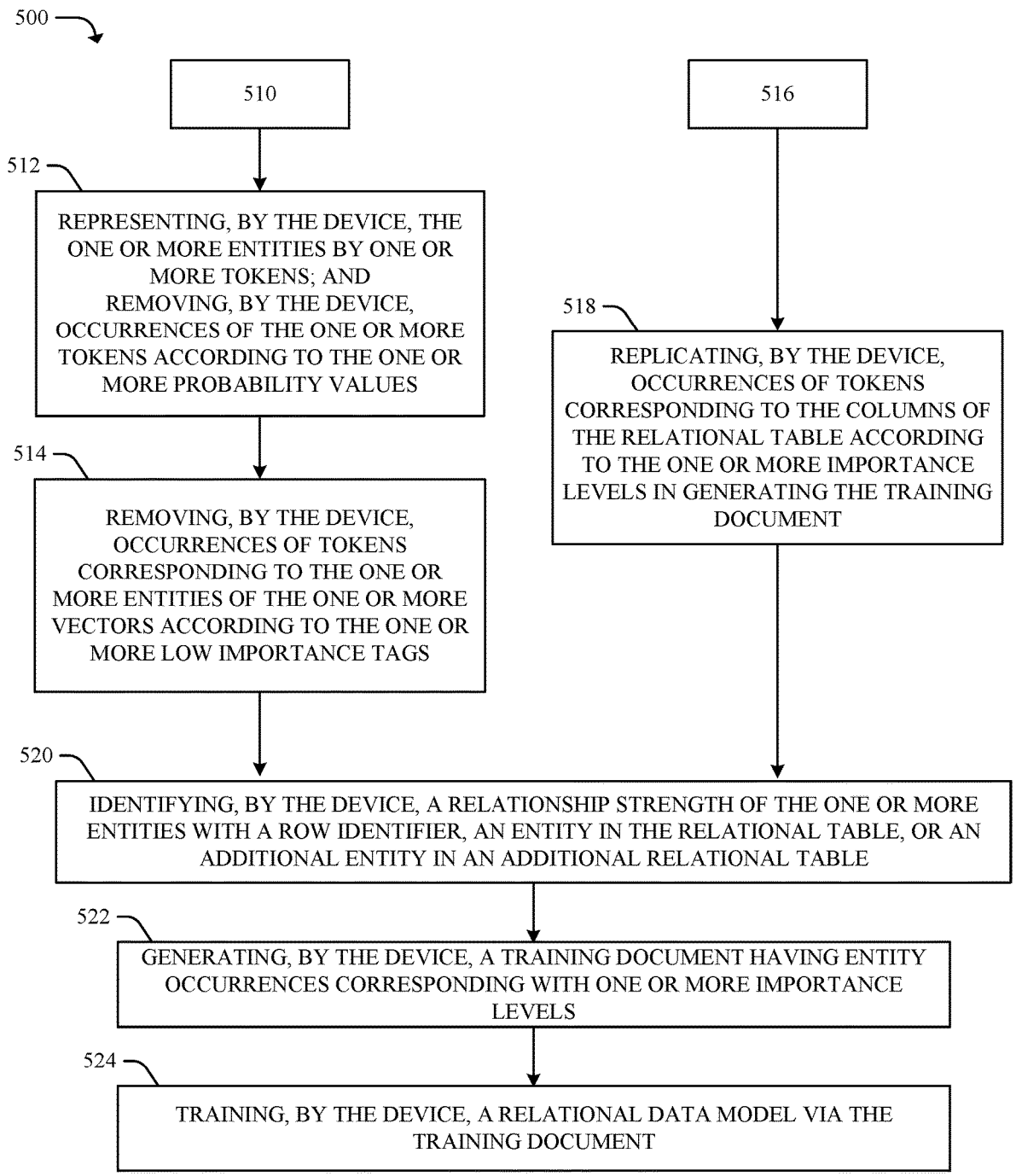
FIG. 6 illustrates a continuation of the flow diagram of FIG. 5 and is of an example, non-limiting computer-implemented method that can facilitate using importance tags to direct training of vectors of an AI-powered database in accordance with one or more embodiments described herein.

With embodiments, FIGS. 5 and 6 illustrate a flow diagram of an example, non-limiting computer-implemented method 500 that can facilitate using one or more importance tags 302-306 to direct training of a relational data model 250 (e.g., an AI-powered database) in accordance with one or more embodiments described herein. Repetitive descriptions of like elements and/or processes employed in respective embodiments is omitted for sake of brevity.

At 502, the computer-implemented method 500 can comprise, receiving, by a device (e.g., the user input component 102, the relational component 104, and the training component 106) operatively coupled to a processor, user-specified schema information for weight-based model training (e.g., training a relational data model 250). The computer-implemented method 500 can be implemented via a GUI connected to the device, which can receive information (e.g., user-specified schema information) from the user in one or more of a variety of manners. The user-specified schema information can identify whether to weigh the data via value-based priority or column-based priority. The computer-implemented method 500 can comprise generating one or more vectors 300 to represent one or more rows of a relational table 200. Additionally, the computer-implemented method 500 can comprise representing the row of the relational table 200 by a row identifier, which can be a primary key (e.g., a token).

At 504, the computer-implemented method 500 can comprise identifying, by the device (e.g., the user input component 102, the relational component 104, and the training component 106), one or more importance levels for one or more entities of a relational table based on the user-specified schema information. The computer-implemented method 500 can comprise assigning weights to tokens of the vector 300 according to the user specified schema information.

At 506, the computer-implemented method 500 can comprise generating, by the device (e.g., the user input component 102, the relational component 104, and the training component 106), a training document having entity occurrences corresponding with the one or more importance levels.

At 508, the computer-implemented method 500 (e.g., step 506) can comprise determining, by the device (e.g., the user input component 102, the relational component 104, and the training component 106), whether to weigh the one or more entities based on column attributes or based on value. The user-specified schema information can include information indicating a desire to sort via value-based priority or via column-based priority. Further, the computer-implemented method 500 can further include assigning, by the device, one or more importance tags corresponding with the one or more importance levels to direct training of one or more vectors of the training document.

At 510, the computer-implemented method 500, in response to a user indicating the desire to weigh the one or more entities by value attribute, can comprise generating, by the device (e.g., the user input component 102, the relational component 104, and the training component 106), one or more probability values to compare the one or more entities with a low level of importance threshold.

Further, at 512, the computer-implemented method 500 can comprise representing, by the device (e.g., the user input component 102, the relational component 104, and the training component 106), the one or more entities by one or more tokens; and removing, by the device, occurrences of the one or more tokens according to the one or more probability values. The method 500 can comprise determining, by the device (e.g., the user input component 102, the relational component 104, and the training component 106), if a probability of occurrence for the one or more probability values is within a corresponding threshold for the low level of importance.

At 514, the computer implemented method 500, in response to a user indicating the desire to weigh the one or more entities by value, can comprise removing, by the device (e.g., the user input component 102, the relational component 104, and the training component 106), occurrences of tokens corresponding to the one or more entities of the one or more vectors according to the one or more low importance tags in generating the training document 400.

At 516, the computer-implemented method 500 can comprise assigning, by the device (e.g., the user input component 102, the relational component 104, and the training component 106), importance tags to the columns of the relational table 200 according to the user-specified schema information.

At 518, the computer implemented method 500, in response to a user indicating the desire to weigh the one or more entities by column, can comprise replicating, by the device (e.g., the user input component 102, the relational component 104, and the training component 106), occurrences of tokens corresponding to the columns of the relational table (e.g., one or more entities of the one or more vectors) according to the one or more importance levels in generating the training document 400. Additionally or alternatively, the computer implemented method 500 can comprise replicating, by the device, occurrences of tokens corresponding to the values of the relational table further according to the one or more importance levels (e.g., importance tags) in generating the training document 400.

At 520, the computer implemented method 500 can comprise identifying, by the device (e.g., the user input component 102, the relational component 104, and the training component 106), a relationship strength of the one or more entities with a row identifier, an entity in the relational table, or an additional entity in an additional relational table.

At 522, the computer-implemented method 500 can comprise generating, by the device (e.g., the user input component 102, the relational component 104, and the training component 106), a training document 400 having entity occurrences corresponding with one or more importance levels. The computer-implemented method 500 can comprise assigning, via the user-specified schema information, labels/tags to the one or more entities such as low importance, medium importance, and high importance.

At 524, the computer-implemented method 500 can comprise training, by the device (e.g., the user input component 102, the relational component 104, and the training component 106), a relational data model 250 via the training document 400 (e.g., the weight-based training document as specified by the user-specified schema information).

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively mitigate the prorogation of errors from the generative stage to the parser training stage as the one or more embodiments described herein can enable this process. And, neither can the human mind nor a human with pen and paper mitigate the propagation of errors from the generative stage to the parser training stage, as conducted by one or more embodiments described herein.

FIG. 7 illustrates a block diagram of an example, non-limiting operating environment 700 in which one or more embodiments described herein can be facilitated. FIG. 7 and the following discussion are intended to provide a general description of a suitable operating environment 700 in which one or more embodiments described herein at FIGS. 1-6 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 700 contains an example of an environment for the execution of at least some of the computer code involved in performing the inventive methods, such as importance tag AI-database training code block 745. In addition to block 745, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 745, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 745 in persistent storage 713.

COMMUNICATION FABRIC 711 is the signal conduction paths that allow the various components of computer 701 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in block 745 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
  a memory that stores computer executable components; and
  a processor that executes at least one of the computer-executable components that:
    receives user-specified schema information for weight-based model training;
    identifies importance levels for one or more entities of a group of rows of a relational table based on the user-specified schema information, wherein the importance levels are assigned respective thresholds and respective occurrence multipliers, and wherein the one or more entities comprises at least one of a value in a row of the group of rows or a column in the relational table; and
    generates a training document having value occurrences in vectors corresponding with the importance levels, wherein the generating comprises, for each row of the group of rows:
      generating a vector comprising a token for each value in the row,
      for each value in the row that is assigned a respective importance level from the importance levels in the user-specified schema information, removing the token in the vector corresponding to the value in response to determining that a probability value associated with the token does not satisfy the respective threshold assigned to the respective importance level assigned to the value, and
      for each column in the row that is assigned a respective importance level from the importance levels in the user-specified schema information, replicating the token in the vector corresponding to the value in the column by the respective occurrence multiplier assigned to the respective importance level assigned to the column in response to determining that the token has not been removed.

2. The system of claim 1, wherein a higher importance level of the importance levels is assigned the respective occurrence multiplier that is higher than the respective occurrence multiplier assigned to a lower importance level of the importance levels.

3. The system of claim 1, wherein a higher importance level of the importance levels is assigned the respective threshold that is higher than the respective threshold assigned to a lower importance level of the importance levels.

4. The system of claim 1, wherein the generating, for each row of the group of rows, further comprises:
  generating the probability value using a random number generator.

5. The system of claim 1, wherein the generating, for each row of the group of rows, further comprises:
  adding the vector to the training document.

6. The system of claim 1, wherein the importance levels comprise a low importance level, a medium importance level, and a high importance level.

7. The system of claim 1, wherein the at least one of the computer-executable components further:
  trains a relational data model using the training document.

8. A computer implemented method, comprising:
  receiving, by a device operatively coupled to a processor, user-specified schema information for weight-based model training;
  identifying, by the device, importance levels for one or more entities of a group of rows of a relational table based on the user-specified schema information, wherein the importance levels are assigned respective thresholds and respective occurrence multipliers, and wherein the one or more entities comprises at least one of a value in a row of the group of rows or a column in the relational table; and generating, by the device, a training document having value occurrences in vectors corresponding with the importance levels, wherein the generating comprises, for each row of the group of rows:
- generating a vector comprising a token for each value in the row,
- for each value in the row that is assigned a respective importance level from the importance levels in the user-specified schema information, removing the token in the vector corresponding to the value in response to determining that a probability value associated with the token does not satisfy the respective threshold assigned to the respective importance level assigned to the value, and
- for each column in the row that is assigned a respective importance level from the importance levels in the user-specified schema information, replicating the token in the vector corresponding to the value in the column by the respective occurrence multiplier assigned to the respective importance level assigned to the column in response to determining that the token has not been removed.

9. The computer implemented method of claim 8, wherein a higher importance level of the importance levels is assigned the respective occurrence multiplier that is higher than the respective occurrence multiplier assigned to a lower importance level of the importance levels.

10. The computer implemented method of claim 8, wherein a higher importance level of the importance levels is assigned the respective threshold that is higher than the respective threshold assigned to a lower importance level of the importance levels.

11. The computer implemented method of claim 8, wherein the generating, for each row of the group of rows, further comprises:
generating the probability value using a random number generator.

12. The computer implemented method of claim 8, wherein the generating, for each row of the group of rows, further comprises:
adding the vector to the training document.

13. The computer implemented method of claim 8, wherein the importance levels comprise a low importance level, a medium importance level, and a high importance level.

14. The computer implemented method of claim 8, further comprising:
training, by the device, a relational data model using the training document.

15. A computer program product for specifying importance of relationships of a relational table, the computer program product comprising a non-transitory computer readable medium having program instructions embodied therewith, the program instructions executable by a processor to cause the processor to:

receive user-specified schema information for weight-based model training;
identify importance levels for one or more entities of a group of rows of the relational table based on the user-specified schema information, wherein the importance levels are assigned respective thresholds and respective occurrence multipliers, and wherein the one or more entities comprises at least one of a value in a row of the group of rows or a column in the relational table; and
generate a training document having value occurrences in vectors corresponding with the importance levels, wherein the generating comprises, for each row of the group of rows:
- generating a vector comprising a token for each value in the row,
- for each value in the row that is assigned a respective importance level from the importance levels in the user-specified schema information, removing the token in the vector corresponding to the value in response to determining that a probability value associated with the token does not satisfy the respective threshold assigned to the respective importance level assigned to the value, and
- for each column in the row that is assigned a respective importance level from the importance levels in the user-specified schema information, replicating the token in the vector corresponding to the value in the column by the respective occurrence multiplier assigned to the respective importance level assigned to the column in response to determining that the token has not been removed.

16. The computer program product of claim 15, wherein a higher importance level of the importance levels is assigned the respective occurrence multiplier that is higher than the respective occurrence multiplier assigned to a lower importance level of the importance levels.

17. The computer program product of claim 15, wherein a higher importance level of the importance levels is assigned the respective threshold that is higher than the respective threshold assigned to a lower importance level of the importance levels.

18. The computer program product of claim 15, wherein the generating, for each row of the group of rows, further comprises:
generating the probability value using a random number generator.

19. The computer program product of claim 15, wherein the generating, for each row of the group of rows, further comprises:
adding the vector to the training document.

20. The computer program product of claim 15, wherein the importance levels comprise a low importance level, a medium importance level, and a high importance level.

\* \* \* \* \*